United States Patent [19]

Itoh et al.

[11] Patent Number: 5,458,996
[45] Date of Patent: Oct. 17, 1995

[54] INORGANIC NONAQUEOUS ELECTROLYTIC SOLUTION CELL

[75] Inventors: Noriyuki Itoh, Settsu; Kenichi Yokoyama, Takatsuki, both of Japan

[73] Assignee: Hitachi Maxell, Ltd., Osaka, Japan

[21] Appl. No.: 383,010

[22] Filed: Feb. 3, 1995

[30] Foreign Application Priority Data

Feb. 7, 1994 [JP] Japan .................................. 6-035259

[51] Int. Cl.⁶ .................................................. H01M 6/14
[52] U.S. Cl. ...................... 429/196; 429/194; 429/197; 429/198; 429/199; 429/200
[58] Field of Search ................................. 429/194, 196, 429/197, 198, 199, 200

[56] References Cited

U.S. PATENT DOCUMENTS

| | | | |
|---|---|---|---|
| 4,844,997 | 7/1989 | Klinedinst et al. | 429/196 |
| 4,888,255 | 12/1989 | Yoshimitsu et al. | 429/196 |
| 4,997,730 | 3/1991 | Morigaki et al. | 429/196 |
| 5,030,525 | 7/1991 | Hisatomi et al. | 429/196 |
| 5,059,498 | 10/1991 | Hisatomi et al. | 429/196 |
| 5,202,203 | 4/1993 | Delnick | 429/196 |
| 5,352,546 | 10/1994 | Chua et al. | 429/196 |

*Primary Examiner*—John Niebling
*Assistant Examiner*—Bruce F. Bell
*Attorney, Agent, or Firm*—Birch, Stewart, Kolasch & Birch

[57] ABSTRACT

An inorganic nonaqueous electrolytic solution cell containing an oxyhalide which is in a liquid state at room temperature as a positive electrode active material, and a solvent of an electrolytic solution and an alkali metal as a negative electrode active material, in which the electrolytic solution contains a tertiary or quaternary organic silane compound, and a Lewis acid is dissolved in the electrolytic solution in an amount larger than a stoichiometric equivalent of a Lewis base which comprises a halide of an alkali metal present in the electrolytic solution.

4 Claims, 1 Drawing Sheet

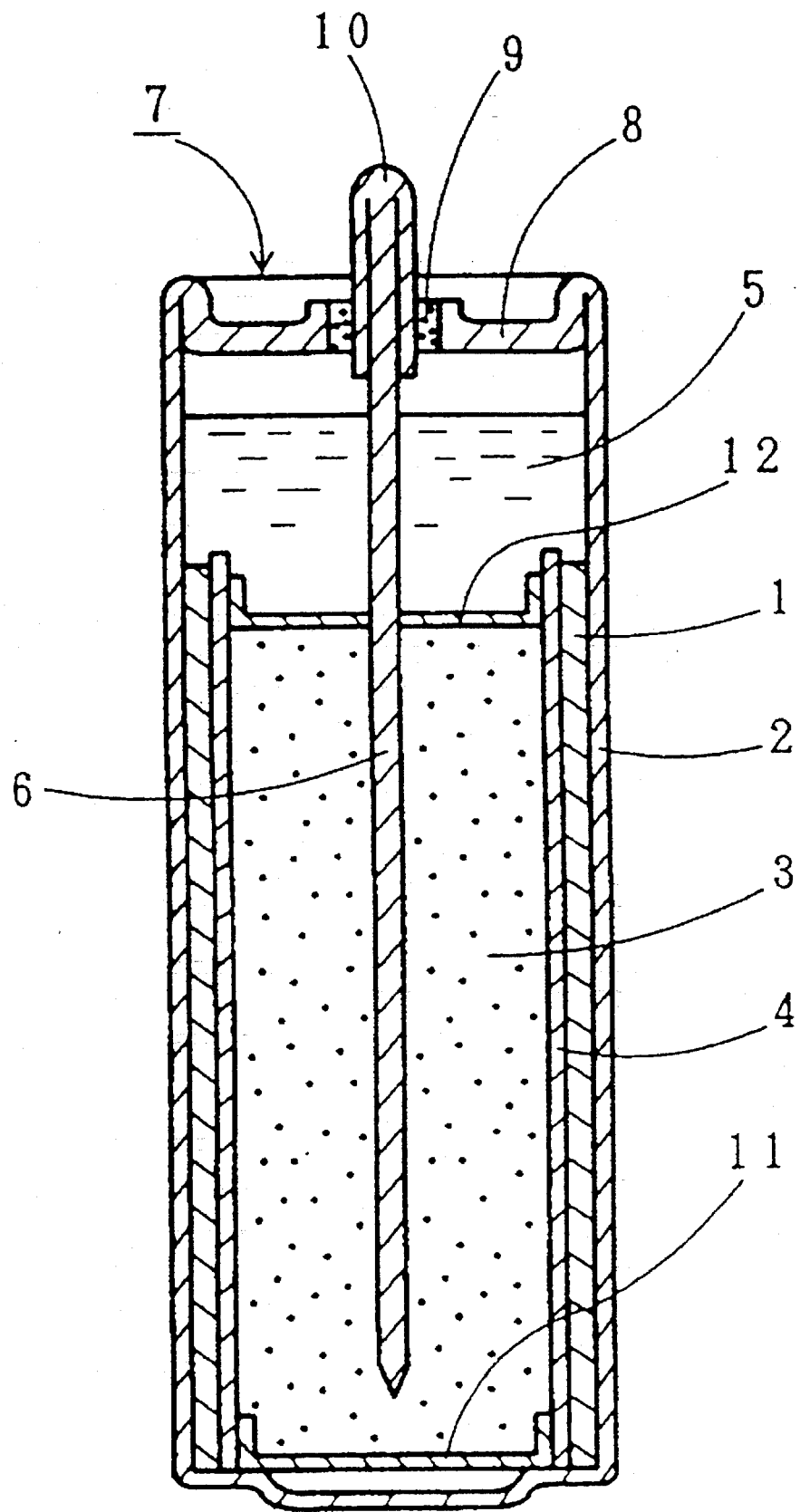

INORGANIC NONAQUEOUS ELECTROLYTIC SOLUTION CELL

BACKGROUND OF THE INVENTION

1. Field of the Invention

The present invention relates to an inorganic nonaqueous electrolytic solution cell. In particular, the present invention relates to an inorganic nonaqueous electrolytic solution cell which suffers less voltage drop in an initial discharge period after storage and has a short restoring time of a discharge voltage.

2. Description of the Related Art

In an inorganic nonaqueous electrolytic solution cell comprising an oxyhalide which is in a liquid state at room temperature (25° C.) (e.g. thionyl chloride, sulfuryl chloride, phosphoryl chloride, etc.) as a positive electrode active material and a solvent of an electrolytic solution and an alkali metal (e.g. lithium, sodium, potassium, etc.) as a negative electrode active material, since the positive electrode active material directly contacts the positive electrode, that is, thionyl chloride directly contacts lithium in the case of a thionyl chloride-lithium cell which is one of the typical example of the inorganic nonaqueous electrolytic solution cell, a film of an alkali metal chloride such as lithium chloride is formed on the negative electrode.

While the lithium chloride film is a coarse film in an early stage of the formation, it grows to form a dense film to inactivate the negative electrode, when the cell is stored at a high temperature or it is stored for a long time. As a result, when the cell is used after the storage at a high temperature or long-term storage, the voltage drops in the initial discharge period and the discharge voltage does not reach a desired voltage level. Accordingly, when such a cell is used as an actuating power source, the equipment may not function properly.

In particular, the degree of voltage drop in a whisker shape which appears instantaneously in a period of several hundred microseconds to several milliseconds after the start of discharge is considerable so that the application range of the cell is greatly restricted.

This voltage drop in the initial discharge period appears not only in a first use of a virgin cell after storage but also appears each time when the already used cell is reused after storage.

In view of the above problem of the voltage drop in the initial discharge period, it is proposed to suppress the voltage drop in the initial discharge period by the addition of a halogenated organic silane compound (cf. Japanese Patent KOKAI Publication No. 220279/1986) or an oxygen-containing organic silane compound (cf. Japanese Patent KOKAI Publication No. 3961/1989) to an electrolytic solution.

However, the addition of the halogenated organic silane compound or the oxygen-containing organic silane compound to the electrolytic solution cannot sufficiently suppress the large voltage drop in a whisker shape which appears instantaneously in a period of several hundred microseconds to several milliseconds after the start of discharge or acceleration of the restoration of the discharge voltage after the voltage drop.

SUMMARY OF THE INVENTION

One object of the present invention is to provide an inorganic nonaqueous electrolytic solution cell which exhibits less voltage drop even in the case of a large current discharge after storage at a high temperature or long term storage.

Another object of the present invention is to provide an inorganic nonaqueous electrolyte solution cell which can restore the discharge voltage after the voltage drop in an initial discharge period and does not suffer from a decrease in the working voltage.

According to the present invention, there is provided an inorganic nonaqueous electrolytic solution cell comprising an oxyhalide which is in a liquid state at room temperature as a positive electrode active material, a solvent of an electrolytic solution, and an alkali metal as a negative electrode active material, wherein the electrolytic solution contains an organic silane compound of the formula:

$$SiR_1R_2R_3R_4 \qquad (I)$$

wherein $R_1$, $R_2$, $R_3$ and $R_4$ are the same or different and an alkyl group having 1 to 4 carbon atoms, an alkenyl group having 2 to 4 carbon atoms or an aryl group having 6 to 12 carbon atoms or one of $R_1$, $R_2$, $R_3$ and $R_4$ is a hydrogen atom and the rest of $R_1$, $R_2$, $R_3$ and $R_4$ are the same or different and an alkyl group having 1 to 4 carbon atoms, an alkenyl group having 2 to 4 carbon atoms or an aryl group having 6 to 12 carbon atoms, and a Lewis acid is dissolved in said electrolytic solution in an amount larger than a stoichiometric equivalent of a Lewis base which comprises a halide of an alkali metal present in said electrolytic solution.

BRIEF DESCRIPTION OF THE DRAWING

The Figure shows a schematic cross section of an inorganic nonaqueous electrolytic solution cell according to the present invention.

DETAILED DESCRIPTION OF THE INVENTION

When the quaternary silane compound (I) is added to the electrolytic solution, it is absorbed on a surface of the alkali metal negative electrode and a crystal of an alkali metal chloride grows to a large size so that the alkali metal chloride film formed on the negative electrode is very coarse. Accordingly, the transfer of charge from the negative electrode and the scattering of alkali metal ions from the negative electrode in the electrolytic solution take place smoothly without prevention by the alkali metal chloride film, so that the degree of polarization is decreased, the voltage drop in the initial discharge period is suppressed, and the restoring time of the discharge voltage is shortened.

If only the organic silane compound (I) is added to the electrolytic solution, a white precipitate of a Lewis base is formed due to the silane compound (I) and an electric conductivity of the electrolytic solution is decreased to cause the decrease of the a working voltage.

In the present invention, the Lewis acid is dissolved in the electrolytic solution in an amount larger than the stoichiometric equivalent of the Lewis base to prevent the formation of the white precipitate of the Lewis base, whereby the electric conductivity of the electrolytic solution is restored and a decrease in the working voltage of the cell is prevented.

The reason for the above mechanism is not fully understood, but may be assumed to be as follows:

The organic silane compound (I) reacts with the Lewis acid dissolved in the electrolytic solution to form a complex so that the silane compound (I) would be present in a more stable state in the electrolytic solution. This hypothesis is explained in more detail as follows.

First, the Lewis acid forms a complex with the Lewis base in the electrolytic solution. When the organic silane compound (I) is added to the electrolytic solution, the Lewis acid is liberated from the complex with the Lewis base and reacts with the organic silane compound (I) to form another complex. The liberated Lewis base is precipitated since its solubility in the electrolytic solution is small.

Since the complex of the organic silane compound (I) and the Lewis acid has a property of the Lewis acid, it is present near the negative electrode and increases the size of crystal of a alkali metal chloride which is precipitated on the negative electrode, whereby a coarse alkali metal chloride film is formed. Consequently, the growth and densification of the alkali metal chloride film may be suppressed, decrease of discharge voltage in the initial discharge period can be prevented, and the restoring time of the discharge voltage can be shortened.

The Lewis base which is precipitated by the addition of the organic silane compound (I) induces the decrease of the conductivity of the electrolytic solution and then decreases the working voltage of the cell. But, since the excess amount of the Lewis acid is dissolved in the electrolytic solution in the present invention, the precipitated Lewis base forms a complex with the Lewis acid and is present in the electrolytic solution in a dissolved state. Then, the decrease of the conductivity of the electrolytic solution and the decrease of the working voltage may be prevented.

The present invention, however, not be bound by the above explanation.

The organic silane compound to be used in the present invention is expressed by the above formula (I). Specific examples of the alkyl group are a methyl group, an ethyl group, a propyl group and a butyl group. Specific examples of the alkenyl group are a vinyl group, an allyl group, and so on. Specific example of the aryl group are a phenyl group, a tolyl group, a naphthalenyl group, and so on.

Specific examples of the organic silane compound (I) are tetramethylsilane [$(CH_3)_4Si$], triethylsilane [$(C_2H_5)_3SiH$], tetraethylsilane [$(C_2H_5)_4Si$], n-butyltrimethylsilane [$(C_4H_9)Si(CH_3)_3$], phenyltrimethylsilane [$(CH_3)_3SiC_6H_5$], phenyltriethylsilane [$(C_2H_5)_3SiC_6H_5$], and the like. Among them, tetramethylsilane, triethylsilane, tetraethylsilane, and n-butyltrimethylsilane are more preferred.

The amount of the organic silane compound (I) to be added to the electrolytic solution is preferably from 0.01 mol/l to 0.5 mol/l. When the amount of the organic silane compound (I) is smaller than 0.01 mol/l, the effect to coarsen the alkali metal chloride film formed on the negative electrode is not sufficiently achieved. When the amount is larger than 0.5 mol/l, the effect of suppressing the voltage drop in the initial discharge period is not increased as the amount is increased. Rather, an amount of the positive electrode active material is decreased as the amount of the organic silane compound is increased and then a discharge capacity of the cell is lowered.

An amount of the Lewis acid exceeding the stoichiometric equivalent of the Lewis base is from one sixth (⅙) to three quarters (¾), preferably one quarter (¼) to one half (½) of the mole of the added organic silane compound (I).

When the exceeding amount of the Lewis acid is smaller than one sixth of the mole of the organic silane compound (I), the precipitated Lewis acid is scarcely dissolved in the electrolytic solution so that the working voltage of the cell is lowered. When the exceeding amount of the Lewis acid is larger than three quarters of the organic silane compound (I), the amount of the Lewis acid is too large and the Lewis acid reacts with the alkali metal negative electrode to corrode the negative electrode and accelerates the densification of the alkali metal chloride film. Then, the effect of the addition of the organic silane compound (I) is deteriorated.

In the cell of the present invention, the oxyhalide which is in the liquid state at room temperature (25° C.) such as thionyl chloride, sulfonyl chloride, sulfurl chloride and so on is used as the positive electrode active material. This oxyhalide functions also as a solvent of the electrolytic solution in the cell.

The electrolytic solution is prepared by the addition of an electrolyte (e.g. $LiAlCl_4$, $LiAlBr_4$, $LiGaCl_4$, $LiB_{10}C_{10}$, etc.) to the oxyhalide. To form the electrolyte, LiCl and $AlCl_3$ are added to the oxyhalide, whereby $LiAlCl_4$ is formed, which is present in the electrolytic solution in the ionized form of $Li^+$ and $AlCl_4^-$.

The organic silane compound (I) and the exceeding amount of the Lewis acid may be added to the already prepared electrolytic solution, or may be added to the oxyhalide together with the electrolyte or before the addition of the electrolyte.

As the Lewis acid, a halide of a trivalent metal such as $AlCl_3$, $AlBr_3$, $GaCl_3$ and the like is preferable used.

As the Lewis base, a halide of an alkali metal such as LiCl, LiBr, NaCl, NaBr, KCl and the like is preferably used.

As the negative electrode active material of the cell according to the present invention, an alkali metal such as lithium, sodium and potassium is used.

PREFERRED EMBODIMENTS OF THE INVENTION

The present invention will be illustrated by the following Examples, which will not limit the scope of the present invention in any way.

EXAMPLE 1

A thionyl chloride-lithium cell was produced using thionyl chloride as a positive electrode active material and lithium as a negative electrode active material.

An electrolytic solution comprising 1.2 mol/l of $LiAlCl_4$ was prepared by adding LiCl and $AlCl_3$ to thionyl chloride.

To the electrolytic solution, 0.30 mol/l of tetramethylsilane was added and further $AlCl_3$ as a Lewis acid was dissolved in an amount larger by 0.15 mol/l than the stoichiometric equivalent of LiCl as a Lewis base.

The Figure shows a schematic cross section of a cell produced in this Example. The cell comprises a negative electrode 1, cell case 2 with a bottom, a positive electrode 3, a separator 4, an electrolytic solution 5, a positive electrode collector 6, a lid 7, a bottom insulator 11, and an upper insulator 12.

The negative electrode is formed in a cylinder by pressing a sheet of lithium onto an inner wall of the cell case 2 made of stainless steel.

The positive electrode 3 is made of a carbonaceous porous material which comprises acetylene black and a small amount of polytetrafluoroethylene as a binder. It is separated from the negative electrode 1 by the separator 4.

The separator 4 is made of a nonwoven fabric of glass fibers and has a cylindrical form.

The electrolytic solution 5 is explained above.

In this cell, since thionyl chloride as the positive electrode active material functions also as the solvent of the electrolytic solution, a relatively large amount of the electrolytic solution is contained in the cell.

Since thionyl chloride is the positive electrode active material, the positive electrode 3 itself does not participate in the reaction but provides a reaction space where thionyl chloride as the positive electrode material reacts with the lithium ions which are ionized from the negative electrode 1 and dissolved in the electrolytic solution.

The positive electrode collector 6 is made of a stainless steel rod.

The cell lid 7 comprises a body 8, a glass layer 9 and a positive electrode terminal 10. The body 8 is made of stainless steel and its upstanding periphery is welded to an opening edge of the cell case 2.

The glass layer 9 is provided on an inner periphery of the body 8 and insulates the body 8 from the positive electrode terminal 10. The outer peripheral surface of the glass layer 9 is fusion bonded to the inner peripheral surface of the body 8, while the inner peripheral surface of the glass layer 9 is fusion bonded to the outer peripheral surface of the positive electrode terminal 10, whereby a gap between the body 8 and the positive electrode terminal 10 is sealed.

The positive electrode terminal 10 is made of stainless steel. A part of the terminal 10 is in the form of a pipe during the assembly of the cell and used as an inlet for pouring the electrolytic solution in the cell. After pouring the electrolytic solution, its upper end is sealed by welding the upper end to the upper part of the positive electrode collector 6 which is inserted in the hollow space of the cylindrical terminal 10.

The bottom insulator 11 is made of a nonwoven fabric of glass fibers and insulates the positive electrode 3 from the cell case 2 which functions also as a negative electrode collector.

The upper insulator 12 is also made of a nonwoven fabric of glass fibers and insulates the positive electrode 3 from the body 8 of the cell lid 7 which has the positive electrode collector 10.

The bottom of the cell case 2 may have a thin walled part (not shown) of, for example, a cross form to prevent the explosion of the cell caused by increased pressure in the cell due the rise of the cell temperature and the like.

EXAMPLE 2

In the same manner as in Example 1 except that triethylsilane in an amount of 0.30 mol/l was used in place of tetramethylsilane, a thionyl chloride-lithium cell was produced.

EXAMPLE 3

In the same manner as in Example 1 except that n-butyltrimethylsilane in an amount of 0.30 mol/l was used in place of tetramethylsilane, a thionyl chloride-lithium cell was produced.

EXAMPLE 4

In the same manner as in Example 1 except that tetramethylsilane was used in an amount of 0.03 mol/l and $AlCl_3$ as the Lewis acid was dissolved in an amount larger by 0.015 mol/l than the stoichiometric equivalent of LiCl as the Lewis base, a thionyl chloride-lithium cell was produced.

EXAMPLE 5

In the same manner as in Example 1 except that tetraethylsilane in an amount of 0.50 mol/l was used in place of tetramethylsilane and $AlCl_3$ as the Lewis acid was dissolved in an amount larger by 0.25 mol/l than the stoichiometric equivalent of LiCl as the Lewis base, a thionyl chloride-lithium cell was produced.

EXAMPLE 6

In the same manner as in Example 1 except that tetraethylsilane in an amount of 0.30 mol/l was used in place of tetramethylsilane and $AlCl_3$ as the Lewis acid was dissolved in an amount larger by 0.075 mol/l than the stoichiometric equivalent of LiCl as the Lewis base, a thionyl chloride-lithium cell was produced.

EXAMPLE 7

In the same manner as in Example 1 except that tetraethylsilane in an amount of 0.30 mol/l was used in place of tetramethylsilane and $AlCl_3$ as the Lewis acid was dissolved in an amount larger by 0.15 mol/l than the stoichiometric equivalent of LiCl as the Lewis base, a thionyl chloride-lithium cell was produced.

EXAMPLE 8

In the same manner as in Example 1 except that tetraethylsilane in an amount of 0.30 mol/l was used in place of tetramethylsilane and $AlCl_3$ as the Lewis acid was dissolved in an amount larger by 0.05 mol/l than the stoichiometric equivalent of LiCl as the Lewis base, a thionyl chloride-lithium cell was produced.

EXAMPLE 9

In the same manner as in Example 1 except that tetraethylsilane in an amount of 0.30 mol/l was used in place of tetramethylsilane and $AlCl_3$ as the Lewis acid was dissolved in an amount larger by 0.225 mol/l than the stoichiometric equivalent of LiCl as the Lewis base, a thionyl chloride-lithium cell was produced.

EXAMPLE 10

In the same manner as in Example 1 except that tetraethylsilane in an amount of 0.30 mol/l was used in place of tetramethylsilane and $AlCl_3$ as the Lewis acid was dissolved in an amount larger by 0.30 mol/l than the stoichiometric equivalent of LiCl as the Lewis base, a thionyl chloride-lithium cell was produced.

COMPARATIVE EXAMPLE 1

In the same manner as in Example 1 except that thionyl chloride containing only 1.2 mol/l of $LiAlCl_4$ was used as an electrolytic solution, a thionyl chloride-lithium cell was produced.

COMPARATIVE EXAMPLE 2

In the same manner as in Example 1 except that thionyl chloride containing only 0.30 mol/l of tetraethylsilane was used as an electrolytic solution, a thionyl chloride-lithium cell was produced.

COMPARATIVE EXAMPLE 3

In the same manner as in Example 1 except that thionyl chloride which contained 0.30 mol/l of tetraethylsilane and in which $AlCl_3$ as the Lewis acid was dissolved in an amount larger by only 0.03 mol/l than the stoichiometric equivalent of LiCl as the Lewis base was used as an electrolytic solution, a thionyl chloride-lithium cell was produced.

Each of the cells produced in Examples 1–10 and Comparative Examples 1, 2 and 3 was stored at 60° C. for 40 days. Then, the cell was discharged at 20° C. with a resistance of 300 Ω for 5 seconds, and the lowest voltage (TMV) and a voltage after 5 seconds from the start of discharge (EDV) were measured. Further, after continuous discharge with the resistance of 300 Ω for 24 hours, a working voltage was measured.

The results are shown in the Table.

TABLE

| Example No. | Amount of quaternary organic silane (mol/l) | Exceeding amount of Lewis acid (mol/l) | TMV (V) | EDV (V) | Working voltage (V) |
|---|---|---|---|---|---|
| Ex. 1 | 0.30 | 0.15 | 3.30 | 3.45 | 3.52 |
| Ex. 2 | 0.30 | 0.15 | 3.28 | 3.47 | 3.50 |
| Ex. 3 | 0.30 | 0.15 | 3.26 | 3.41 | 3.51 |
| Ex. 4 | 0.03 | 0.015 | 3.28 | 3.47 | 3.54 |
| Ex. 5 | 0.50 | 0.25 | 3.38 | 3.46 | 3.51 |
| Ex. 6 | 0.30 | 0.075 | 3.43 | 3.51 | 3.50 |
| Ex. 7 | 0.30 | 0.15 | 3.45 | 3.50 | 3.52 |
| Ex. 8 | 0.30 | 0.05 | 3.41 | 3.53 | 3.47 |
| Ex. 9 | 0.30 | 0.225 | 3.40 | 3.49 | 3.48 |
| Ex. 10 | 0.30 | 0.30 | 3.27 | 3.40 | 3.45 |
| C. Ex. 1 | 0.00 | 0 | 2.51 | 2.17 | 3.50 |
| C. Ex. 2 | 0.30 | 0 | 3.37 | 3.51 | 3.40 |
| C. Ex. 3 | 0.30 | 0.03 | 3.38 | 3.50 | 3.42 |

The above results show that, when the cell was discharged at a large current against a resistance of 300 Ω after storage at 60° C. for 40 days, the cell of each of Examples 1 to 10 had the lowest voltage (TMV) of larger than 3 V and did not suffer from the large voltage drop in the initial discharge period and it showed a short restoring time of discharge voltage since the voltage after 5 seconds was high, while there was some difference among the cells depending on the kinds and amounts of the organic silane compounds.

The cell of Comparative Example 1 using the electrolytic solution containing no organic silane compound had the lowest voltage of 2.52 V and suffered from a large voltage drop in the initial discharge period.

The cell of Comparative Example 2 in which $AlCl_3$ was not added in an excess amount or the cell of Comparative Example 3 in which an exceeding amount of $AlCl_3$ was very small had the lower working voltage after 24 hours than the cells of the present invention, while the problem of the voltage drop in the initial discharge period was solved.

Among the cells of the Examples according to the present invention, those of Examples 1–9 in which the exceeding amount of $AlCl_3$ as the Lewis acid was in the range of one sixth to three quarters of the mole of the added organic silane compound had the high working voltage after 24 hours. In particular, the cells of Examples 1–7 in which this exceeding amount was in the range of one quoter to one half of the mole of the added organic silane compound had the particularly improved properties since the working voltage was 3.50 V or higher after 24 hours.

With the cell of Example 10 in which this exceeding amount was larger than three quoters of the mole of the added organic silane compound, the working voltage after 24 hours tended to decrease.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inorganic nonaqueous electrolytic solution cell comprising an oxyhalide which is in a liquid state at room temperature as a positive electrode active material and a solvent of an electrolytic solution and an alkali metal as a negative electrode active material, wherein said electrolytic solution contains an organic silane compound of the formula:

$$SiR_1R_2R_3R_4 \qquad (I)$$

wherein $R_1$, $R_2$, $R_3$ and $R_4$ are the same or different and each $R_1$, $R_2$, $R_3$ or $R_4$ are from the group consisting of an alkyl group having 1 to 4 carbon atoms, an alkenyl group having 2 to 4 carbon atoms and an aryl group having 6 to 12 carbon atoms or one of $R_1$, $R_2$, $R_3$ and $R_4$ is a hydrogen atom and the rest of $R_1$, $R_2$, $R_3$ and $R_4$ are the same or different and each $R_1$, $R_2$, $R_3$ or $R_4$ are from the group consisting of an alkyl group having 1 to 4 carbon atoms, an alkenyl group having 2 to 4 carbon atoms or an aryl group having 6 to 12 carbon atoms, and a Lewis acid is dissolved in said electrolytic solution in an amount larger than a stoichiometric equivalent of a Lewis base which comprises a halide of an alkali metal present in said electrolytic solution.

2. The inorganic nonaqueous electrolytic solution cell according to claim 1, wherein said organic silane compound is at least one compound selected from the group consisting of tetramethylsilane, triethylsilane, tetraethylsilane and n-butyltrimethylsilane.

3. The inorganic nonaqueous electrolytic solution cell according to claim 1, wherein an amount of said organic silane compound in said electrolytic solution is from 0.01 to 0.5 mol/l.

4. The inorganic nonaqueous electrolytic solution cell according to claim 1, wherein an exceeding amount of said Lewis acid is one sixth to three quarters of the mole of said organic silane compound.

* * * * *